(12) United States Patent  
Clifton et al.

(10) Patent No.: US 9,348,721 B2  
(45) Date of Patent: *May 24, 2016

(54) DIAGNOSING ENTITIES ASSOCIATED WITH SOFTWARE COMPONENTS

(71) Applicant: International Business Machines Corporation, Armonk, NY (US)

(72) Inventors: John M. Clifton, Hertforshire (GB); Matthew John Fairhurst, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,311

(22) Filed: Jul. 20, 2015

(65) Prior Publication Data

US 2015/0324267 A1      Nov. 12, 2015

Related U.S. Application Data

(63) Continuation of application No. 13/484,200, filed on May 30, 2012, now Pat. No. 9,116,806, which is a continuation of application No. 13/223,170, filed on Aug. 31, 2011, now Pat. No. 9,086,970.

(30) Foreign Application Priority Data

Oct. 7, 2010   (EP) ................................. 10186827

(51) Int. Cl.
| | |
|---|---|
| *G06F 11/00* | (2006.01) |
| *G06F 11/30* | (2006.01) |
| *G06F 11/34* | (2006.01) |
| *G06F 11/07* | (2006.01) |

(52) U.S. Cl.
CPC ............ *G06F 11/302* (2013.01); *G06F 11/079* (2013.01); *G06F 11/0727* (2013.01); *G06F 11/3409* (2013.01)

(58) Field of Classification Search
CPC   G06F 11/0766; G06F 11/079; G06F 11/0709
See application file for complete search history.

(56) References Cited

U.S. PATENT DOCUMENTS

| | | |
|---|---|---|
| 5,935,260 A | 8/1999 | Ofer |
| 6,314,533 B1 | 11/2001 | Novik et al. |
| 6,442,711 B1 | 8/2002 | Sasamoto et al. |
| 7,107,497 B2 | 9/2006 | McGuire et al. |
| 7,313,721 B2 | 12/2007 | Ashmore |
| 7,340,641 B1 | 3/2008 | Binger |

(Continued)

OTHER PUBLICATIONS

Advisory Action from U.S. Appl. No. 13/484,200, dated Mar. 18, 2015.

(Continued)

*Primary Examiner* — Philip Guyton  
(74) *Attorney, Agent, or Firm* — Zilka-Kotab, PC (57) ABSTRACT

In one embodiment, a method includes evaluating event history information for each of one or more events associated with a hardware entity against a symptom rule, the symptom rule defining a validity state of a diagnosis. The method also includes identifying contextual information by receiving and inspecting the event history information in response to the symptom rule being satisfied and the diagnosis being validated. An indication of the validity state of the diagnosis is sent to at least one subscriber that has requested a subscription specifically for the diagnosis.

20 Claims, 6 Drawing Sheets

(56) References Cited

U.S. PATENT DOCUMENTS

| | | | |
|---|---|---|---|
| 7,437,375 | B2 | 10/2008 | Borthakur et al. |
| 7,526,684 | B2 | 4/2009 | Bicknell et al. |
| 7,574,623 | B1 | 8/2009 | Goel et al. |
| 7,702,971 | B2 | 4/2010 | Nguyen et al. |
| 7,921,199 | B1 | 4/2011 | Shirriff et al. |
| 9,086,970 | B2 * | 7/2015 | Clifton et al. |
| 9,116,806 | B2 * | 8/2015 | Clifton et al. |
| 2004/0164206 | A1 | 8/2004 | Jammu et al. |
| 2007/0130320 | A1 | 6/2007 | Morgan et al. |
| 2008/0282104 | A1 | 11/2008 | Khan |
| 2009/0089503 | A1 | 4/2009 | Yoshida et al. |
| 2009/0249117 | A1 | 10/2009 | Horikoshi |
| 2009/0290247 | A1 | 11/2009 | Ito et al. |
| 2012/0089874 | A1 | 4/2012 | Clifton et al. |
| 2012/0239982 | A1 | 9/2012 | Clifton et al. |

OTHER PUBLICATIONS

Final Office Action from U.S. Appl. No. 13/223,170, dated Apr. 2, 2014.
Final Office Action from U.S. Appl. No. 13/223,170, dated Dec. 31, 2014.
Final Office Action from U.S. Appl. No. 13/484,200, dated Apr. 1, 2014.
Final Office Action from U.S. Appl. No. 13/484,200, dated Jan. 7, 2015.
Microsoft, "Receiving a WMI Event," retrieved via archive.org, Dec. 26, 2008.
Non-Final Office Action from U.S. Appl. No. 13/223,170, dated Jul. 15, 2014.
Non-Final Office Action from U.S. Appl. No. 13/223,170, dated Nov. 12, 2013.
Non-Final Office Action from U.S. Appl. No. 13/484,200, dated Jul. 15, 2014.
Non-Final Office Action from U.S. Appl. No. 13/484,200, dated Nov. 8, 2013.
Notice of Allowance from U.S. Appl. No. 13/223,170, dated Mar. 11, 2015.
Notice of Allowance from U.S. Appl. No. 13/484, 200, dated Apr. 20, 2015.
Clifton et al., U.S. Appl. No. 13/223,170, filed Aug. 31, 2011.
Clifton et al., U.S. Appl. No. 13/484,200, filed May 30, 2012.

* cited by examiner

DIAGNOSING ENTITIES ASSOCIATED WITH SOFTWARE COMPONENTS

RELATED APPLICATIONS

This application is a continuation of copending U.S. patent application Ser. No. 13/484,200, filed May 30, 2012; which is a continuation of U.S. patent application Ser. No. 13/223,170, filed Aug. 31, 2011; which claims priority to European Patent Application No. 10186827.1 filed Oct. 7, 2010, which are herein incorporated by reference.

BACKGROUND

The present invention relates to diagnostic methods for entities associated with software components, and in particular, it relates to independent symptom checking and event recording to provide a decoupled diagnosis arrangement.

In conventional large multi-component software applications, one component may wish to perform an action based upon what has happened to an entity associated with another component of the system by diagnosing a particular state of the entity. For example, a software component supporting a redundant array of independent disks (RAID) may wish to know when one type of disk making up one of a set of disk arrays has been subject to a certain number of recording-medium errors in a particular time period. Such a circumstance may result in a diagnosis of a disk failure and can be remedied by the removal of a disk from the array.

Typical approaches invoke a framework in which software components communicate directly with each other to obtain information relating to the status of associated entities, such as by polling. This communication can produce a burdensome processing overhead for the components, potentially reducing performance, and furthermore requires a tight coupling between the components, otherwise the process may fail. Tight coupling is disadvantageous in software design and development because it complicates software maintenance and reduces the potential for code reuse as software components are written specifically for either direct or indirect coupling between components.

BRIEF SUMMARY

In one embodiment, a method includes evaluating event history information for each of one or more events associated with a hardware entity against a symptom rule, the symptom rule defining a validity state of a diagnosis. The method also includes identifying contextual information by receiving and inspecting the event history information in response to the symptom rule being satisfied and the diagnosis being validated. An indication of the validity state of the diagnosis is sent to at least one subscriber that has requested a subscription specifically for the diagnosis.

A computer program product according to one embodiment includes a computer readable storage medium having program instructions embodied therewith, the program instructions executable by a processing device to cause the processing device to perform the foregoing method.

A system according to one embodiment includes modules for performing various operations of the foregoing method.

Other aspects and embodiments as described in the present specification will become apparent from the following detailed description, which, when taken in conjunction with the drawings, illustrate by way of example the principles of the invention.

DETAILED DESCRIPTION

The following description is made for the purpose of illustrating the general principles as described in the present specification and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for diagnosing an entity associated with a software component for diagnosis of operating conditions for entities associated with decoupled software components without adversely impacting system performance and without other disadvantages of the existing approaches.

In one general embodiment, a system includes a recording module adapted for recording event history information for one or more events associated with an entity, an evaluating module adapted for evaluating the event history information for each of the one or more events associated with the entity against a symptom rule, wherein the symptom rule defines a validity state of a diagnosis, an issuing module adapted for issuing a subscription to one or more subscribers, wherein the subscription enables the one or more subscribers to receive diagnosis information, and an indicating module adapted for indicating the validity state of the diagnosis to the subscriber, wherein the recording module and the evaluating module are independent such that the issuing module and the event history information are substantially decoupled.

In another general embodiment, a computer program product includes a computer readable storage medium having computer readable program code embodied therewith, the computer readable program code including computer readable program code configured to: record event history information for one or more events associated with an entity, evaluate the event history information for each of the one or more events associated with the entity against a symptom rule, wherein the symptom rule defines a validity state of a diagnosis, issue a subscription to one or more subscribers, wherein the subscription enables the one or more subscribers to receive diagnosis information, and indicate the validity state of the diagnosis to the subscriber, wherein the computer readable program code configured to issue the subscription to the one or more subscribers and the event history information are substantially decoupled.

According to another general embodiment, a method includes recording event history information for one or more events associated with an entity, evaluating the event history information for each of the one or more events associated with the entity against a symptom rule, wherein the symptom rule defines a validity state of a diagnosis, issuing a subscription to one or more subscribers, wherein the subscription enables the one or more subscribers to receive diagnosis information, and indicating the validity state of the diagnosis to the subscriber, wherein the recording and the evaluating are performed independently such that the event history information and the issuing are substantially decoupled.

As will be appreciated by one skilled in the art, aspects as described in the present specification may be embodied as a system, method or computer program product. Accordingly, aspects as described in the present specification may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects as described in the present specification may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. More specific examples (a non-exhaustive list) of the computer readable signal medium would include the following: an electrical connection having one or more wires, an optical fiber, any suitable combination of the foregoing, etc. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects as described in the present specification may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects as described in the present specification are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Generally speaking, embodiments of systems, methods, and computer program products as described herein may include and/or utilize components such as a recording module adapted for recording event history information for one or more events associated with an entity, an evaluating module adapted for evaluating the event history information for each of the one or more events associated with the entity against a symptom rule, the symptom rule defining a validity state of a diagnosis, an issuing module adapted for issuing a subscription to one or more subscribers, the subscription enabling the one or more subscribers to receive diagnosis information, and an indicating module adapted for indicating the validity state of the diagnosis to the subscriber. Furthermore, the recording module and the evaluating module may operate independently such that the issuing module and the event history information and are substantially decoupled.

Referring now specifically to the event history information, in one approach, event information may be provided to the one or more subscribers as trace information for a problem diagnosis.

Referring now to the symptom rule, in another approach, the symptom rule may include one or more event history conditions relating to events occurring during operation, including, but not limited to types of events and frequency of events. Of course, other event history conditions may also be included in the symptom rule, and furthermore may be defined by a user, as would be understood by one having ordinary skill in the art upon reading the present descriptions.

In one embodiment, the recording module, the evaluating module, and the indicating module may each be independent components (such as software and/or hardware components), according to one approach, and may be capable of being utilized independently in methods, systems, and computer program products described herein. Furthermore, in such embodiments, the independent components may be interoperable via at least one of an application programming interface and/or a shared data interface.

Moreover, in another embodiment, the recording module and the evaluating module may be independent components (such as software and/or hardware components) that are also utilized independently in methods, systems, and computer program products as described herein. Moreover, these independent components may be interoperable via a shared data interface including the event history information.

In another approach, systems, methods, and computer program products as described herein my additionally include and/or utilize an analyzing module adapted for analyzing an event profile comprising one or more events associated with the entity, and may furthermore include and/or utilize a determining module adapted for determining whether the one or more events associated with the entity are to be recorded to the event history information.

The entity may be any component associated with a software component, including hardware and/or software, as would be understood by those having ordinary skill in the art upon reading the present descriptions. For example, in one embodiment, the entity may be a storage device in a redundant array of independent disks (RAID).

Figure 1:
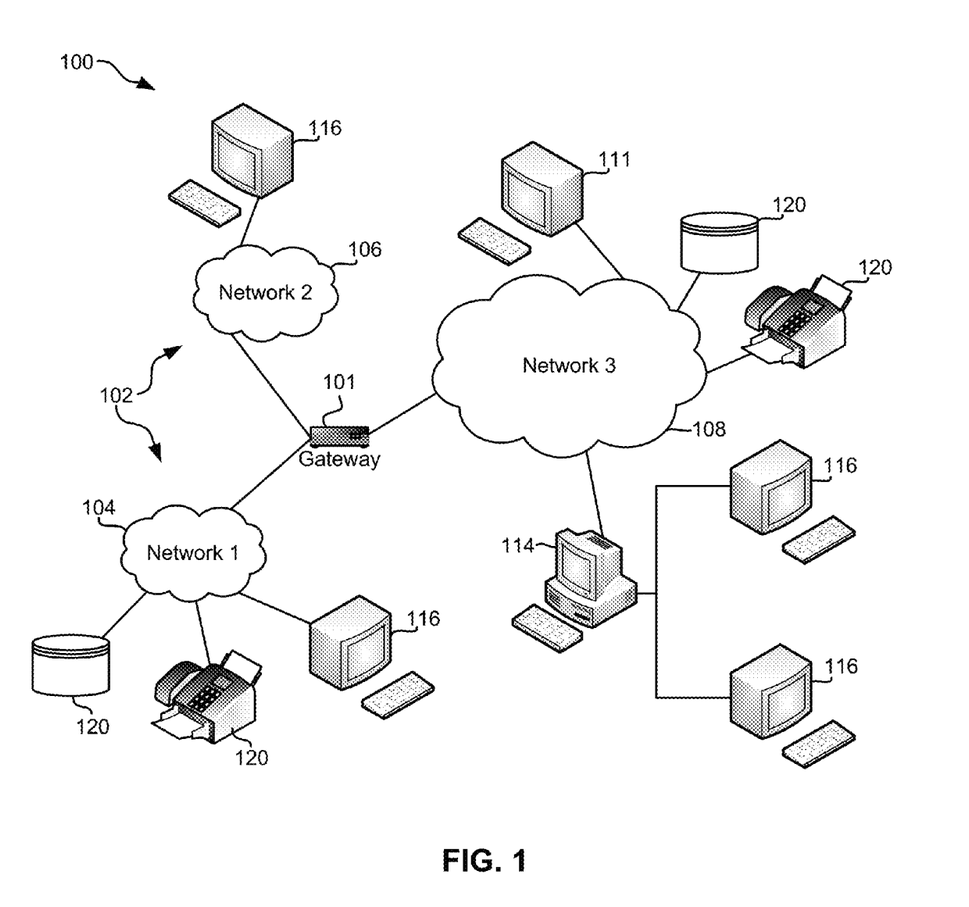
FIG. 1 illustrates a network architecture, in accordance with one embodiment.

Referring now to the Figures, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
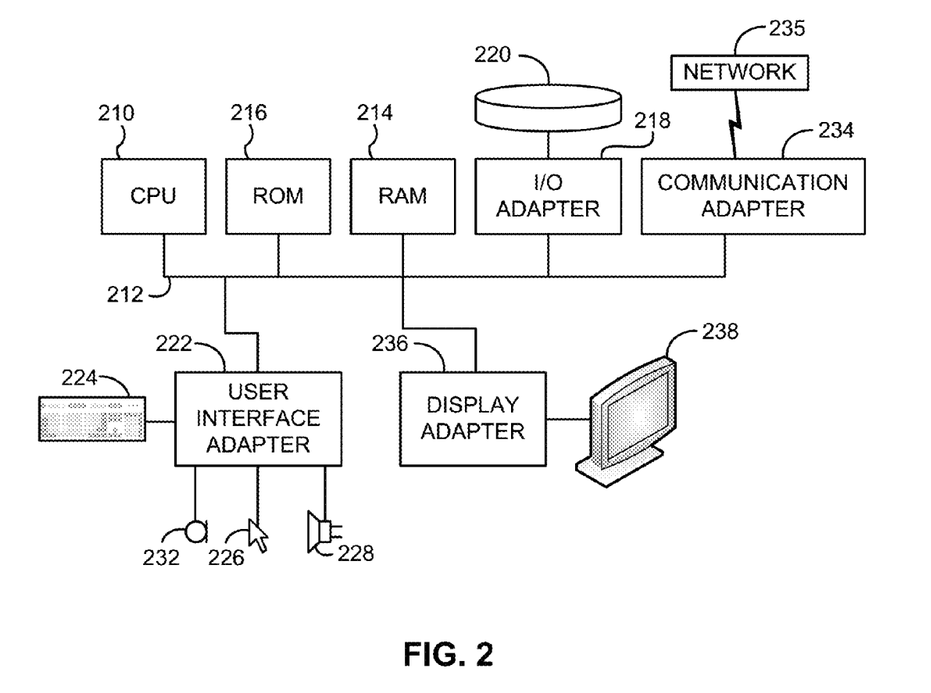
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Figure 3:
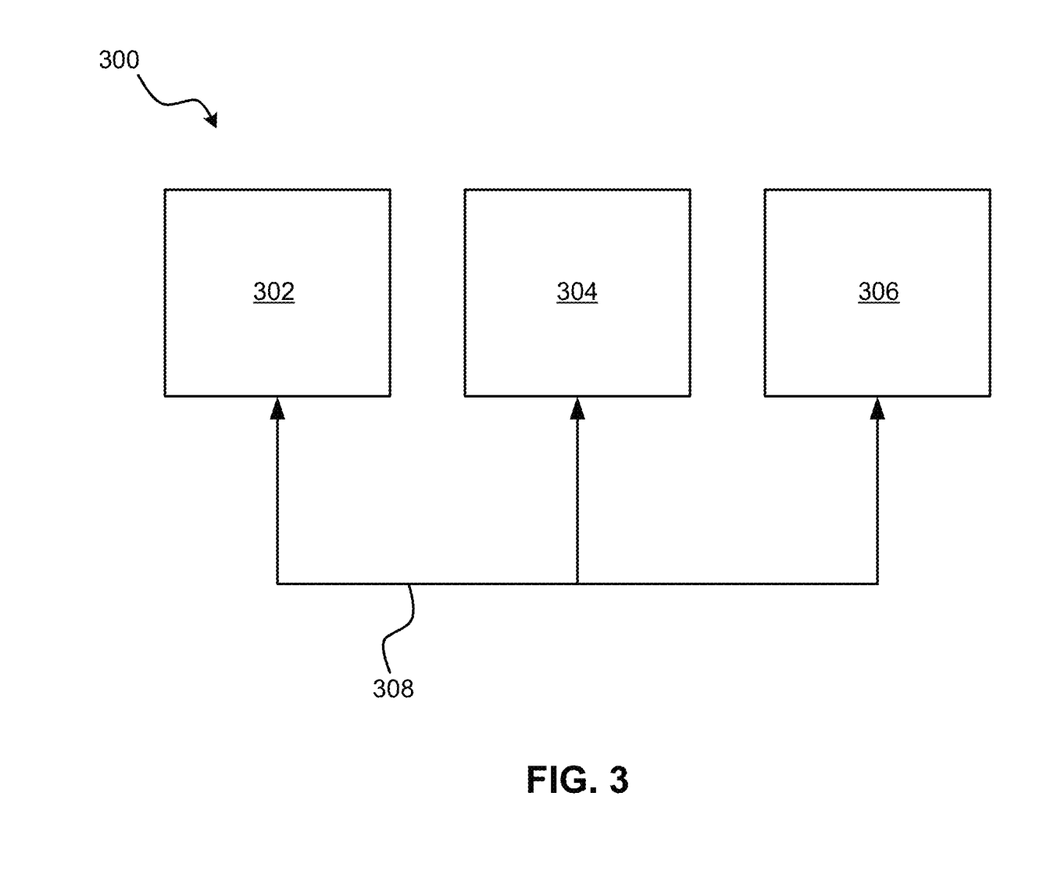
FIG. 3 is a block diagram of a computer system, according to one embodiment.

FIG. 3 is a simplified block diagram of a system 300 suitable for operation as described herein according to various embodiments. A central processor unit (CPU) 302 or some other suitable processing device, such as a field programmable gate array (FPGA), an application specific integrated circuit (ASIC), etc., is communicatively connected to a storage medium 304 and an input/output (I/O) interface 306 via a data bus 308. The storage medium 304 may be any read/write storage device, such as a RAM, ROM, a non-volatile storage device, etc., as would be appreciated by one of skill in the art upon reading the present descriptions. An example of a non-volatile storage device includes a disk, Flash memory, a tape storage device, etc. The I/O interface 306 may take the form of an interface to devices for the input of data, for the output of data, or for both input and output of data. Examples of I/O devices connectable to I/O interface 306 include a keyboard, a mouse, a display (such as a monitor), a network connection, etc. Of course, other I/O interfaces are possible, as would be understood by one having ordinary skill in the art.

Figure 4:
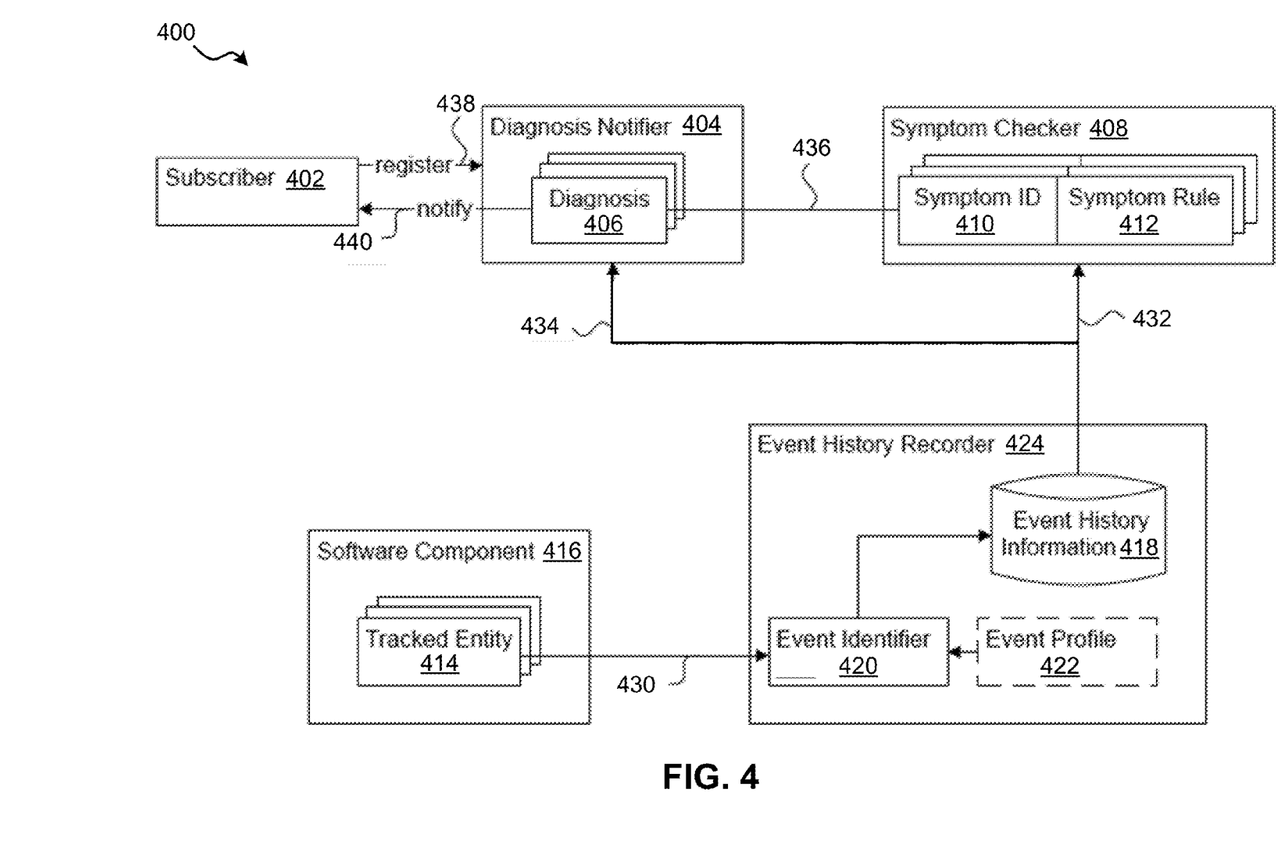
FIG. 4 is a block diagram of one embodiment of an arrangement of components for diagnosis of entities associated with software components.

FIG. 4 is a simplified block diagram of an arrangement of components 400 for diagnosing an entity associated with software components in a storage system, in accordance with one embodiment. The environment shown includes a component 416 (any of the components described herein may be software components, hardware components, and/or a combination of software and hardware components) associated with one or more of a plurality tracked entities 414. The tracked entity 414 may be any resource, object, or software component either implemented in hardware, software, firmware of a combination thereof, as would be understood by those having ordinary skill in the art upon reading the present descriptions.

For example, in one embodiment the software component 416 may be associated with an array of storage entities (such as a RAID). In such an arrangement, the tracked entity 414 is included with the software component 416, although it will be clear to those skilled in the art that an entity associated with the software component 416 may take other forms.

In an alternative embodiment, the tracked entity 414 may be separated from the software component 416 by a hardware and/or software interface, communications mechanism, or other suitable mechanism of association as understood by those with ordinary skill in the art.

In more embodiments, a subscription-issuing module 402 may be provided as a component that requests and/or relies on information regarding diagnosis of the tracked entity 414. Diagnosis information may include one or more specific diagnoses 406 corresponding to a state of the tracked entity 414, in one approach.

For example, in one instance, tracked entity 414 states may include an operating state, an error state, a transition state, a operational conclusion, or any other state of the tracked entity, as would be understood by those having ordinary skill in the art upon reading the present descriptions. Moreover, a storage-medium recording error within the tracked entity may be indicative of a particular diagnosis 406, such as an entity failure. Further still, in some embodiments a series of such storage-medium diagnoses 406 may be characterized as fitting a particular profile, e.g., occurring in a particular timeframe, occurring with a particular frequency, occurring successively for a particular number of iterations, etc., as would be understood by those having ordinary skill in the art. Such a diagnosis pattern may additionally correspond to a particular complex diagnosis 406, in some embodiments.

The subscription-issuing module 402 preferably receives a notification 440 of a diagnosis 406 relating to the tracked entity 414 via a diagnostic arrangement in accordance with a preferred embodiment as described herein. Advantages as described in the present specification are provided, at least in part, by the separation and decoupling of a diagnosis mechanism from the software component 416 associated with the tracked entity 414, as is described in further detail herein.

In one embodiment, an event history recording module 424 may be provided for recording event history information 418, for example, in a file, buffer, and/or other similar data store mechanisms, such as by using events generated for the tracked entity 414. The recording module 424 may be a software and/or hardware entity adapted for communication with a source of one or more events for the tracked entity 414. Alternatively, in other embodiments all or some of the recording module 424 functionality may be performed by the software component 416 or the tracked entity 414. In one embodiment, the recording module 424 may include an event identifier 420 adapted for identifying events generated for the tracked entity 414 and communicated 430 to the recording module 424. The events can include generation of information, errors, status reports, and/or other events reflecting the operation, performance, status and/or other attributes of the tracked entity 414, as would be understood by those having ordinary skill in the art upon reading the present descriptions.

Moreover, as shown in FIG. 4, the events may be reported via a communication connection 430 from the tracked entity 414 to the event identifier 420. It will be clear to those skilled in the art that events may alternatively be generated by the software component 416, and in many cases these events originating from the software component 416 result from the association between the software component 416 and the tracked entity 414.

In a further alternative embodiment, events may be generated by a different component (not illustrated) that is operable to work with either the tracked entity 414 or the software component 416, or both. It will be clear to those skilled in the art that the events relating to the tracked entity 414 and communicated via communication connection 430 to the recording module 424 may be generated by any component or entity involved in the operation of the tracked entity 414 capable of observing or responding to the behavior and/or function of the tracked entity 414, including a combination of the software component 416, the tracked entity 414 itself, and other entities not explicitly specified here but would be understood by persons having ordinary skill in the art upon reading the present descriptions.

In some embodiments, event history information 418 may be stored in a data store, such as a storage device, data structure, database and/or other suitable storage mechanisms as would be understood by those having ordinary skill in the art. For example, the event history information may be stored in one or more array data structures. Each entry in the event history information 418 includes information from a communicated event. Preferably, each entry further includes a timestamp and a uniqueness identifier for use in discerning entries from one another.

Optionally, the recording module 424 may include an event profile 422 for defining which events generated for the tracked entity 414 are to be recorded in the event history information 418. For example, the event profile 422 may be a software and/or hardware component including rules that define what qualifies as an event suitable for recording in the event history information 418.

In some embodiments, the diagnosis mechanism of FIG. 4 further includes an evaluating module 408 and an indicating module 404. The evaluating module 408 is a software and/or hardware component adapted to access and evaluate the event history information 418 for the existence of predefined symptoms. The evaluating module 408 may include one or more symptom definitions each including a symptom identifier 410, a symptom rule 412, and a reference 436 to a specific diagnosis 406, according to one embodiment. Notably, the symptom identifier 410 may be used to uniquely identify a symptom. In many cases, the symptom rule 412 may include criteria for the associated specific diagnosis 406 to be rendered valid. The validation of the diagnosis 406 indicates that the diagnosis 406 is applicable to the tracked entity 414.

In one embodiment, symptom rule 412 may include criteria relating to the nature, type, and/or identification of events generated for the tracked entity 414 and stored in the event history information 418. Furthermore, symptom rule 412 may include criteria relating to the rate, time period, and/or frequency of such events. For example, in an exemplary arrangement where tracked entity 414 is a disk in a RAID, symptom rule 412 may include the criterion that ten storage-medium error events are generated within a five-minute window. Such error events are recorded, along with a timestamp, in the event history information 418 and the evaluating module 408 can evaluate the event history information 418 for satisfaction of the symptom rule 412, according to an exemplary embodiment.

According to some embodiments, the evaluating module 408 may also evaluate the event history information 418 in accordance with the symptom rule 412 on a periodic, routine, random, or scheduled basis. Alternatively, the evaluating module 408 may perform the evaluation each time the event history information 418 is updated. Notably, the evaluating module 408 and the recording module 424 may be substantially or entirely decoupled, being interoperable via an abstraction, such as an application programming interface (API), a shared data interface, etc. For example, in one embodiment, the evaluating module 408 and recording module 424 may be interoperable by way of the shared event history information 418.

Upon satisfaction of the symptom rule 412, an associated diagnosis 406 may be designated as valid, indicating that the particular diagnosis 406 is applicable to the particular tracked entity 414. The indicating module 404 may be a software and/or hardware component adapted for indicating to the subscription-issuing module 402 that a particular diagnosis is valid via a notification 440 when the symptom rule 412 is satisfied.

Of course, the subscription-issuing module 402 may cooperate, such as by registering 438, with the indicating module 404 to indicate its interest in the diagnosis 406. Those skilled in the art will appreciate that the subscription-issuing module 402 may provide subscription service to one or more subscribers, each capable of registering interest in one or more specific diagnoses. Moreover, in some embodiments, when a specific diagnosis is validated by way of the evaluating module 408, all registered subscribers may receive notification of the diagnosis.

In one embodiment, decoupling the evaluating module from the recording module as described herein avoids the drawbacks of a tightly coupled system, such as lost capacity and/or the inability to modify a structure of an entity, for example, a RAID array, after initialization. Furthermore, using a subscription mechanism for the subscription-issuing module 402 to register interest in particular diagnoses provides further decoupling between the subscription-issuing module 402, the evaluating module 408, and the tracked entity 414, which is still more advantageous.

As will be understood by those having ordinary skill in the art, some embodiments also provide the advantage that the indicating module, evaluating module, and recording module may be developed and maintained as separate entities using different hardware and/or software components interoperable by one or more interfaces. This enables simple modification, addition, and/or deletion of symptom rules without any need for modifying the software component 416, the tracked entity 414, or the recording module 424. As a result, preferred embodiments allow very complex systems to be modeled without code becoming increasingly complex, a common problem with existing diagnosis techniques.

In alternative embodiments, the indicating module 404 is adapted to retrieve, receive, and/or inspect the event history information 418 when the diagnosis 406 is validated. This evaluation provides context and/or trace information to the subscription-issuing module 404 in addition to a notification 440. For example, in some embodiments the diagnosis 406 relates to an error state of the tracked entity 414. In response, the indicating module 404 may further provide historical event information from event history information 418 as the contextual trace information for the subscription-issuing module 402. Notably, in such an arrangement, the indicating module 404 and the recording module 424 may be substantially or entirely decoupled, being interoperable via an abstraction layer such as an API or a shared data interface. For example, the indicating module 404 and the recording module 424 may be interoperable by way of the shared event history information 418, in some embodiments.

Figure 5:
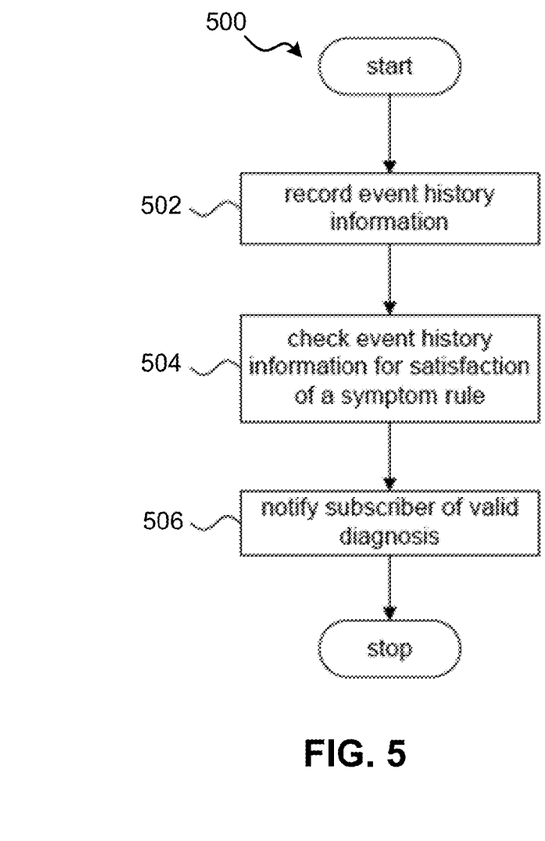
FIG. 5 is a flowchart of a method, according to one embodiment.

FIG. 5 is a flowchart a method 500, in accordance with one embodiment. The method 500 may be carried out in any desired environment, including those shown and described in FIGS. 1-4, among others. Of course, more or less steps than those described and shown in FIG. 5 may be included in method 500, according to various embodiments.

Referring now to FIGS. 4-5, at step 502, the recording module 424 records event history information 418 for the tracked entity 414. At step 504, the evaluating module 408 performs an evaluation 432 of the event history information 418 for the tracked entity 414 to determine if the symptom rule 412 is satisfied. At step 506, the indicating module 404 sends a notification 440 the subscription-issuing module 402 regarding the validity state of the diagnosis 406.

Figure 6:
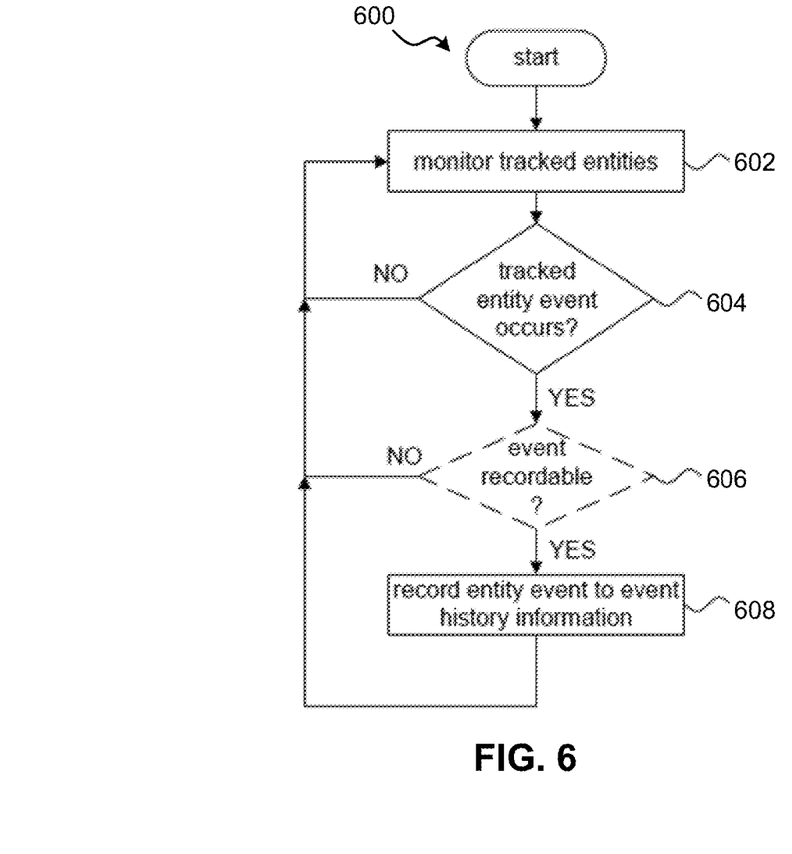
FIG. 6 is a flowchart of a method, according to one embodiment.

FIG. 6 is a flowchart of a method 600 pertaining to the recording module 424 of FIG. 4 in accordance with one embodiment. The method 600 may be carried out in any desired environment, including those shown and described in FIGS. 1-4, among others. Of course, more or less steps than those described and shown in FIG. 6 may be included in method 600, according to various embodiments.

Referring now to FIGS. 4 and 6, at step 602, the recording module 424 monitors the tracked entity 414 to identify new events occurring in (or in relation to) the tracked entity 414. In one embodiment, for example, the event identifier 420 may perform the monitoring functions. Such monitoring may be undertaken actively, so that the recording module 424 actively requests or inspects event information from the tracked entity 414. Alternatively, such monitoring may be undertaken passively such that the recording module 424 receives event information from (or in relation to) the tracked entity 414. In this second instance, the information may be transferred by way of messages, API invocations, software exceptions, hardware exceptions, interrupts, and/or other notification mechanisms as would be understood by those having ordinary skill in the art upon reading the present descriptions.

Moreover, it will be clear to those skilled in the art that the monitoring of step 602 is suitably undertaken in relation to any entity or component capable of generating events for (or in relation to) the tracked entity 414, including the tracked entity 414 itself, the software component 416, and/or another component able to observe and/or respond to the behavior or function of the tracked entity 414. In some embodiments, the functions of step 602 may utilize a combination of the software component 416, the tracked entity 414 itself, and other entities not explicitly specified here.

At step 604, according to one embodiment, it is determined if a new event has occurred in relation to the tracked entity 414.

Next, in optional step 606, it is determined if the newly identified event is capable of being recorded to the event history information 418 by referencing the optional event profile 422, which defines events that qualify for recording. For example, certain events may be uninteresting, irrelevant, duplicative, or otherwise undesirable for recording in the event history information 418, as would be understood by those having ordinary skill in the art upon reading the present descriptions, and the optional profile 422 included within step 606 provides for the exclusion of such events in some embodiments. Moreover, excluding uninteresting, irrelevant, duplicative, or otherwise undesirable events advantageously preserves system resources for other more productive applications.

At step 608, the method stores any newly identified events that qualify for recording in the event history information 418 for subsequent reference by the evaluating module 408.

Figure 7:
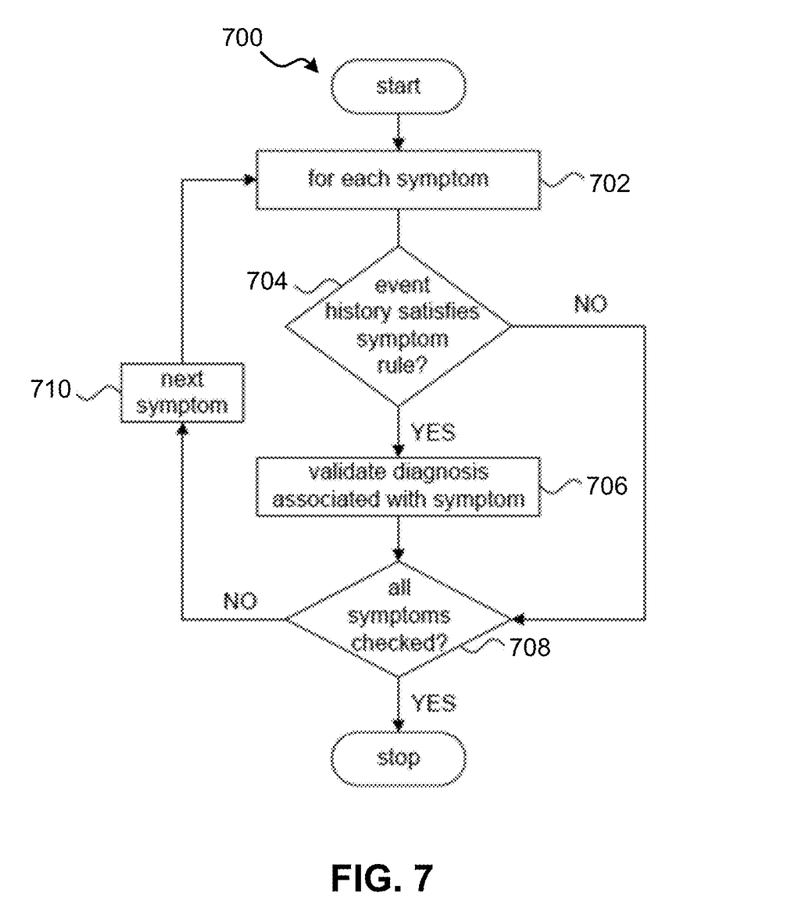
FIG. 7 is a flowchart of a method, according to one embodiment.

FIG. 7 is a flowchart of a method 700 depicting operation of the evaluating module 408 in accordance with a preferred embodiment. The method 700 may be carried out in any desired environment, including those shown and described in FIGS. 1-4, among others. Of course, more or less steps than those described and shown in FIG. 7 may be included in method 700, according to various embodiments.

Referring now to FIGS. 4 and 7, at step 702, a set of one or more symptom definitions is iterated through. It will be clear to those skilled in the art that iterating through symptom definitions in this way is a design choice and that alternative mechanisms for checking the validity of one or more of a set of symptoms may be achieved using alternative techniques, such as by processing each symptom definition in parallel, according to a user-defined schedule, and/or other methodologies.

At step 704, it is determined if the event history information 418 satisfies the symptom rule 412 for a given symptom definition. The evaluating module 408 may access the event history information 418 directly, or through an API, such that the evaluating module 408 and the recording module 424 are substantially or entirely decoupled, in some approaches. Advantageously, this allows each component to be independently designed and developed, as well as enabling components to function independently. Moreover, when the symptom rule 412 is satisfied, the diagnosis 406 associated with the symptom rule is validated at step 706. This results in the indicating module 404 sending a notification 440 to the subscription-issuing module 402 regarding the validity of the diagnosis 406.

At step 708 it is determined if more symptom definitions should be evaluated, and evaluates subsequent symptom definitions at step 710.

The flowchart and block diagrams in the Figures illustrate the architecture, functionality, and operation of possible implementations of systems, methods and computer program products according to various embodiments as described in the present specification. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
an evaluating module configured to evaluate event history information for each of one or more events associated with a hardware entity against a symptom rule, wherein the symptom rule defines a validity state of a diagnosis;
an indicating module configured to, in response to the symptom rule being satisfied and the diagnosis being validated, identify contextual information by receiving and inspecting the event history information,
wherein the system is operable to, in response to receiving the identified contextual information and a notification indicating that the diagnosis is valid, indicate, to at least one subscriber that has requested a subscription specifically for the diagnosis, the validity state of the diagnosis.

2. The system as recited in claim 1, wherein the event history information is provided to the at least one subscriber as trace information for a problem diagnosis.

3. The system as recited in claim 1, wherein the symptom rule comprises one or more event history conditions relating to at least one of:
a type of events; and
a frequency of events.

4. The system as recited in claim 1, comprising a recording module configured to record the event history information for the one or more events occurring on the hardware entity, wherein the recording module, the evaluating module, and the indicating module are each independent components, and wherein the independent components are interoperable via at least one of:
an application programming interface; and
a shared data interface.

5. The system as recited in claim 1, comprising a recording module configured to record the event history information for one or more events occurring on the hardware entity, wherein the recording module and the evaluating module are independent components, and wherein the independent components are interoperable via a shared data interface comprising the event history information.

6. The system as recited in claim 1, comprising:
an analyzing module configured to analyze an event profile comprising the one or more events associated with the entity; and
a determining module configured to determine whether the one or more events associated with the entity are to be recorded to the event history information.

7. The system as recited in claim 1, comprising:
a recording module configured to record the event history information for one or more events occurring on the hardware entity;
an analyzing module configured to analyze an event profile comprising the one or more events associated with the entity; and
a determining module configured to determine whether the one or more events associated with the entity are to be recorded to the event history information,
wherein the event history information is provided to the at least one subscriber as trace information for a problem diagnosis,
wherein the symptom rule comprises one or more event history conditions relating to at least one of:
a type of events; and
a frequency of events,
wherein the recording module, the evaluating module, and the indicating module are each independent components,
wherein the independent components are interoperable via at least one of:
an application programming interface; and
a shared data interface comprising the event history information, and
wherein the entity is a storage device in a redundant array of independent disks (RAID).

8. A computer program product comprising a computer readable storage medium having program instructions embodied therewith, the program instructions executable by a processing device to cause the processing device to perform a method comprising:
evaluate, by the processing device, event history information for each of one or more events associated with a hardware entity against a symptom rule, wherein the symptom rule defines a validity state of a diagnosis;
identify, by the processing device, contextual information by receiving and inspecting the event history information in response to the symptom rule being satisfied and the diagnosis being validated; and
indicate, by the processing device, the validity state of the diagnosis to at least one subscriber that has requested a subscription specifically for the diagnosis.

9. The computer program product as recited in claim 8, wherein the event history information is provided to the at least one subscriber as trace information for a problem diagnosis.

10. The computer program product as recited in claim 8, wherein the symptom rule comprises one or more event history conditions relating to at least one of:
a type of events; and
a frequency of events.

11. The computer program product as recited in claim 8, comprising program instructions executable by the processing device to cause the processing device to record the event history information for one or more events occurring on the hardware entity, wherein the program instructions for evaluating and indicating are interoperable via at least one of:
an application programming interface; and
a shared data interface.

12. The computer program product as recited in claim 11, wherein the shared data interface comprises the event history information.

13. The computer program product as recited in claim 8, comprising:
program instructions executable by the processing device to cause the processing device to analyze an event profile comprising one or more events associated with the entity; and
program instructions executable by the processing device to cause the processing device to determine whether the one or more events associated with the entity are to be recorded to the event history information.

14. A computer program product as recited in claim 8, comprising:
program instructions executable by the processing device to cause the processing device to analyze an event profile comprising one or more events associated with the entity; and
program instructions executable by the processing device to cause the processing device to determine whether the one or more events associated with the entity are to be recorded to the event history information,
wherein the event history information is provided to the at least one subscriber as trace information for a problem diagnosis,
wherein the symptom rule comprises one or more event history conditions relating to at least one of:
a type of events; and
a frequency of events,
wherein the program instructions are interoperable via at least one of:
an application programming interface; and
a shared data interface comprising the event history information, and
wherein the entity is a storage device in a redundant array of independent disks (RAID).

15. A method, comprising:
evaluating event history information for each of one or more events associated with a hardware entity against a symptom rule, wherein the symptom rule defines a validity state of a diagnosis;
identify contextual information by receiving and inspecting the event history information in response to the symptom rule being satisfied and the diagnosis being validated,
indicate the validity state of the diagnosis to at least one subscriber that has requested a subscription specifically for the diagnosis.

16. The method as recited in claim 15, wherein the event history information is provided to the at least one subscriber as trace information for a problem diagnosis.

17. The method as recited in claim 15, wherein the symptom rule comprises one or more event history conditions relating to at least one of:
a type of events; and
a frequency of events.

18. The method as recited in claim 15, comprising recording the hardware event history information for the one or more events occurring on the hardware entity, wherein the recording, the evaluating and the indicating are each performed independently and are interoperable via at least one of:
an application programming interface; and
a shared data interface comprising the event history information.

19. The method as recited in claim 15, comprising:
analyzing an event profile comprising the one or more events associated with the entity; and
determining whether the one or more events associated with the entity are to be recorded to the event history information.

20. The method as recited in claim 15, comprising:
recording the event history information for one or more events occurring on the hardware entity;
analyzing an event profile comprising the one or more events associated with the entity; and
determining whether the one or more events associated with the entity are to be recorded to the event history information,
wherein the event history information is provided to the at least one subscribers as trace information for a problem diagnosis,
wherein the symptom rule comprises one or more event history conditions relating to at least one of:
a type of events; and
a frequency of events,
wherein the recording, the evaluating and the indicating are each performed independently and are interoperable via at least one of:
an application programming interface; and
a shared data interface comprising the event history information,
wherein the recording and the evaluating are performed independently, and
wherein the entity is a storage device in a redundant array of independent disks (RAID).

* * * * *